July 8, 1969    G. H. HUNT ET AL    3,453,766
SIGNALING ATTACHMENT FOR FISHING REELS
Filed March 1, 1967
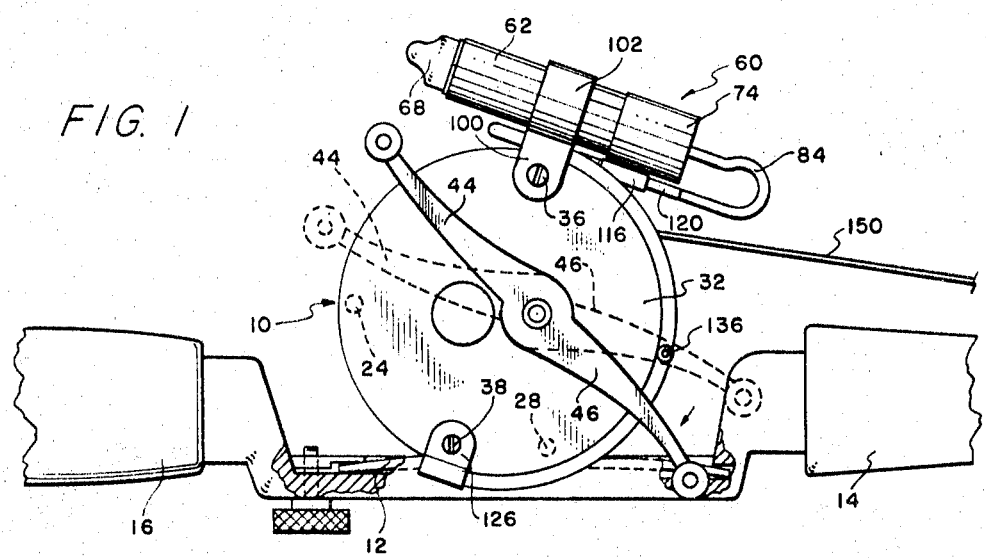
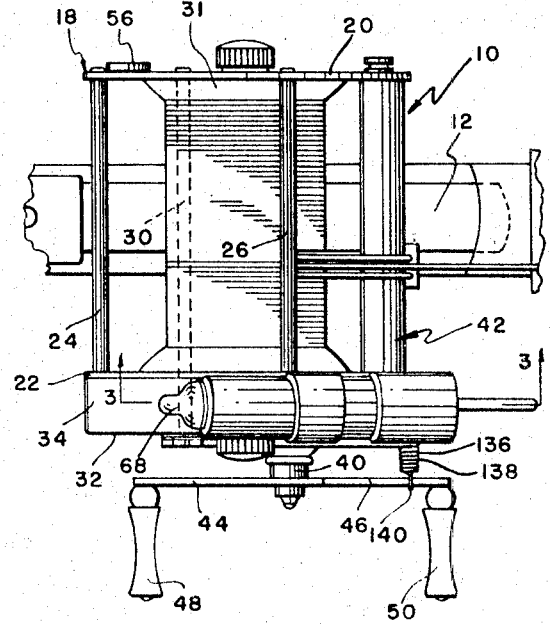
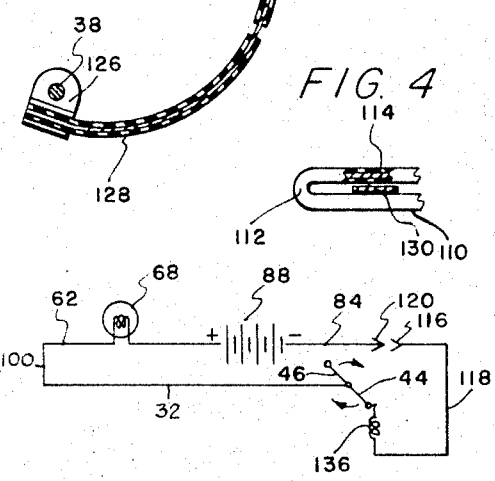
INVENTOR.
GLEN H. HUNT
HOWARD H. NEIMAN
BY
Robert E. Breidenthal
ATTORNEY United States Patent Office 3,453,766
Patented July 8, 1969

3,453,766
SIGNALING ATTACHMENT FOR
FISHING REELS
Glenn H. Hunt, 402 N. Mulberry, and Howard H. Neiman, 710½ N. Main, both of Eureka, Kans. 67045
Filed Mar. 1, 1967, Ser. No. 619,755
Int. Cl. A01k 97/12
U.S. Cl. 43—17                                                    10 Claims

ABSTRACT OF THE DISCLOSURE

A signaling attachment for extant fishing reels which includes mounting means therefor adapted to receive the fasteners of conventional gear housing walls of extant fishing reels therethrough, whereby modification or disassembly of extent fishing reels is not required in mounting the attachment, such attachment comprising a lamp adapted to be placed in electrical series with an electrically conductive frame and crank arm of the fishing reel when the attachment is mounted, and such lamp also being in electrical series with a battery and an electric contactor, such contactor being adapted to be disposed in the travel path of the crank arm when the attachment is mounted, whereby the crank arm in addition to its usual function is enabled to constitute a movable contactor of an electric switch and thus enables the user to be visually signaled by the intermittent energization of the lamp upon rotation of the reel of the fishing reel.

The present invention relates to new and useful improvements in apparatus for flashing a visual signal upon the rotation of the reel of a fishing reel, and pertains more particularly to improved apparatus of such character wherein the electrically conductive crank arm of the conventional fishing reel is, upon combining the attachment of this invention with the conventional fishing reel, caused to fuction as a movable contact of an electric switch in an arrangement such that the crank arm can complete a circuit for energization of a signaling lamp twice during each complete rotation of the crank arm.

The primary object of the present invention is to provide a signaling device attachment which can be mounted upon a conventional fishing reel with a minimum of mechanical skill not involving either modification of or disassembly of the fishing reel, and which attachment will when mounted on the fishing reel result in an existing part of the fishing reel serving the function of the moving contactor of an electric switch controlling the energization of the signaling means.

Another important object of the invention is to provide an attachment of the character specified in the preceding paragraph which can be removed from a fishing reel to which it has been attached with the fishing reel being, after such removal, in precisely the same form as though the attachment had never been employed therewith; this being desirable in that a fisherman may apply the attachment to any one of a plurality of reels that he may possess, and for the reason that a fishing reel owner need not necessarily part with his attachment upon making any sale or trade of a fishing reel to which the attachment had been mounted.

Still another important object of the present invention is to provide an attachment of the character specified above which will when mounted or attached to a conventional fishing reel minimize any obstruction constituted thereby to visual and physical access to the crank arm and the reel.

Yet another object of the invention is to provide an attachment of the character specified above wherein battery replacement may be expeditiously effected.

A final important object to be specifically enumerated is to provide an attachment of the character specified above that is simple, durable and reliable, and which attachment in and of itself does no involve the provision of parts relatively movable during operation of the attachment.

A broad aspect of the invention involves a signaling accessory for use with a conventional fishing reel of the class having an electroconductive frame and an electroconductive reel crank arm in mechanical and electrical contact with the frame; said accessory comprising a signaling device including battery and an electric lamp, each having first and second terminals with the first terminals thereof being in electrical contact, said device being provided with electrically conductive means in electrical engagement with the second terminal of the lamp for enabling the device to be mounted on and electrically connected to the reel frame, and an electric circuit means connected to the second battery terminal and including an electrically conductive resilient contactor adapted to be positioned in the travel path of the crank arm, whereby the accessory may be monuted on a conventional fishing reel and the lamp caused to be energized on each occurrence of the contactor being engaged by the crank arm.

Another broad aspect of the invention has to do with a fishing reel of the type including an electrically conductive frame and an electrically conductive reel crank arm having electrical conductivity with said frame; such fishing reel having in combination therewith an electrically actuated signal means mounted on the frame, and means for supplying electrical energy to said signal means including an electric switch, said switch being normally open and comprising an electric contactor carried by and electrically insulated from the frame, said contactor being disposed in the travel path of the crank arm whereby the contactor is electrically engaged twice and the switch thereby intermittently closed twice during each complete revolution of the crank arm.

An important feature of the invention resides in the combination of a conventional fishing reel with the attachment mounted thereon being such that the electrically conductive crank arm of the fishing reel constitutes the movable contactor of an electric switch.

Still another important feature of the invention resides in the provision of mounting means for the attachment of such character that the mounting of the attachment is made by the dual use of the fasteners normally provided to detachably secure the housing wall of the reel to the reel frame.

Other objects, aspects, features and advantages of the invention will become manifest during the ensuing description of a preferred embodiment of the invention, such description to be taken in conjunction with the accompanying drawings illustrative of such preferred embodiment of the invention, wherein:

FIGURE 1 is a side elevational view from the crank end of a conventional fishing reel, such reel being shown mounted upon a partially illustrated fishing rod, such fishing reel having an alternate position of its crank arm structure shown in dashed outline, and shown with the attachment of this invention mounted thereon;

FIGURE 2 is a top plan view of the structure shown in FIGURE 1;

FIGURE 3 is a sectional view through the attachment of this invention, this view being taken substantially upon the plane of the section line 3—3 in FIGURE 2;

FIGURE 4 is an enlarged fragmentary sectional detail view, this view being taken upon the plane of the section line 4—4 in FIGURE 3; and, FIGURE 5 is a schematic diagram of the electrical circuitry of the signaling means.

Reference is now made to the accompanying drawings, wherein like numerals designate like parts throughout the various views, and wherein the reference numeral 10 designates a conventional fishing reel, the fishing reel 10 being conventionally mounted in a detachable manner by means indicated at 12 upon a conventional fishing rod 14 that includes a handle portion 16.

The fishing reel 10, as is conventional, comprises a metallic frame 18 that includes spaced parallel end walls or plates 20 and 22 which have extending therebetween a plurality of elongated frame members such as indicated at 24, 26, 28 and 30 that are spaced about a reel 31 mounted for rotation in the frame 18 about an axis perpendicular to the plates 20 and 22. In the conventional reel 10 illustrated, each of the members 24 through 30 is secured to both of the plates or walls 20 and 22 with the members 24 and 28 terminating at the plates 20 and 22.

Cooperating with the plate 22 to define a gear housing structure is a circular gear housing wall 32 of metallic material having an integral peripheral flange 34 extending toward and abutting the peripheral margin of the plate 22.

The members 26 and 30 are extended from the plate 22 to abut the side of the wall 32 adjacent the plate 22. Such abutting ends of the members 26 and 30 have threaded recesses therein (not shown) which receive the threaded ends of headed threaded fasteners 36 and 38 that extend through opening in the wall 32 aligned with the members 26 and 30, respectively, whereby the end wall 32 is releasably retained in assembled relation on the frame.

The plate 22 and the wall 32 together with the flange 34 on the latter constitute a gear housing wherein conventional gear means (not shown) is positioned that serves to establish a drive train between a metallic shaft 40 journaled through the wall 32 and the reel 31 and also between such shaft 40 and a conventional level 42 extending between the plates 20 and 22. The shaft 40 is provided with radially extending metallic crank arms 44 and 46, whereby the shaft 40 and consequently also the reel 31 can be caused to rotate by use of the crank handles or finger grips 48, 50. Conversely, rotation of the reel 31 causes rotation of the shaft 40 and the arms 44 and 46.

It is important to note that the metallic construction of the fishing reel 10 thus far described is such that the crank arms 44 and 46, the shaft 40, and the frame 18 (particularly the member 26 and the metallic threaded fastener 36 and preferably also the end wall 32) are in electrical continuity with each other. In other words, a very low (nearly zero) electrical resistance path exists between the crank arms 44 and 46, and the member 26, the fastener 36 and preferably also the end wall 32.

The fishing reel 10 as thus far described is entirely conventional, and it will be readily recognized by those familiar with extant fishing reels that a very large proportion thereof not only possess a characteristic which will be seen to be essential to the practice of the present invention, namely, an electrical conductive crank arm having electrical continuity with the fishing reel frame, as well as another highly desirable (but not absolutely essential) feature, namely, the threaded fastener extending through a peripheral portion of the gear housing wall nearest to the crank arm. Indeed, most such extant reels, if not all such extant reels, include (quite advantageously for the practice of the present invention with respect to the specific embodiment hereinafter described) two such fasteners that are circumferentially spaced from each other.

Though not essential whatever to the present invention, the fishing reel 10, as is conventional, also includes a brake or clicking mechanism (not shown, but which it will be understood is disposed intermediate the end wall or plate 20 and the adjacent flanged end of the reel 31) that can be selectively rendered operative or inoperative by a conventional slide button 56.

With the foregoing as a background, the attachment or signaling device of this invention and its application to and cooperation in combination with the entirely conventional fishing reel 10, as thus far described, will be readily understood.

The attachment or signaling device of this invention is designated generally at 60. The signaling device 60 comprises a metallic sleeve or battery housing 62 that is provided with an integral inturned lip 64 at one end thereof. The lip 64 is of short axial extent, and indeed is only of sufficient extent that the radially innermost edge thereof can be of an internally threaded configuration for threadingly receiving the threaded portion 66 of a conventional electric lamp 68 which can conveniently be of the type customarily used in diminutive flashlights and commonly referred to as penlight lamps. The transparent envelope of the lamp 68 is indicated at 70, and can if desired be of the conventional character constituting a lens. It will be understood that, as viewed in FIGURES 1 and 3, the lamp 68 directs light to the left when the same is energized. As is conventional, the threaded portion 66 of the lamp 68 is metallic and constitutes one of the two terminals of the lamp 68, the other terminal of the lamp 68 being insulated therefrom, and as indicated at 72 is disposed centrally within the battery housing 62.

A metallic cap 74 is provided for the battery housing 62, the cap 74 including an end wall 76 and an integral hollow cylindrical portion 78, the latter being internally threaded and in threaded engagement with external threads 80 provided on the end of the battery housing 62 remote from the lamp 68. The arrangement is such that the cap 74 can be removed from the battery housing 62 when battery replacement is necessary.

The end wall 76 of the cap 74 is apertured centrally at 82, and a flexible insulated electrical conductor 84 slidably extends through the aperture 82. An annular disk 85 of electrical insulation material is disposed within the cap 74 at a position spaced from the end wall 76, the insulating disk 85 being of a diameter such as to be slidable axially within the battery housing 62. The electrically conductive portion of the insulated conductor 84 is extended through the disk 85, and the extremity thereof is formed as an enlarged button 86 to constitute a terminal for making engagement with a dry cell battery 88 disposed within the battery housing 62. The battery 88 is conventional and includes a positive terminal or post 90 in engagement with the lamp terminal 72, and the end of the battery 88 remote from the positive post 90 constitutes the negative terminal 92 of the battery 88, it being understood that the contactor or button 86 is engaged against such negative end 92 of the battery 88. It will also be understood that the body of the battery 88 which is in engagement with the interior of the battery housing 62 is covered with an insulative material or is at least electrically insulated from the post 90 and the end 92 of the battery 88.

In order to insure snug electrical engagement of the lamp terminal 72 with the battery post 90 and also firm electrical engagement of the button or contactor 86 with the end 92 of the battery 88, annular resilient means is disposed within the cap 74 intermediate the end wall 76 and the disk 84 to urge the latter members apart. Such resilient means can be in the form of a coiled compression spring such as indicated at 96, or alternatively, a resilient rubber washer (not shown) can be interposed between the disk 85 and the end wall 76 to perform the desired function.

As thus far describd, it will be evident that the lamp 68 can be energized upon establishing electrical continuity between the battery housing 62 and the conductor of the insulated conductor 84. Means is provided for intermittently establishing such electrical continuity whenever the reel 31 is rotated.

The means for establishing electrical continuity between the conductor of the insulated conductor 84 and the battery housing 62 comprises the battery housing 62 being provided with a radially extending apertured ear or bracket 100. The apertured ear 100 is metallic and is mechanically attached to and in electrical engagement with the metallic battery housing 62. Conveniently, the ear 100 is integral with an arcuate metallic strap 102 that partially embraces and which is soldered to the exterior of the battery housing 62 at a position intermediate the axial extent of the latter.

With the battery housing 62 disposed directly radially outward of the flange 34 (that is, directly radially outward of the gear means embraced by the flange 34), and with the housing 62 oriented more or less tangentially with respect to the periphery of the end wall 32 at the top of the latter and directed toward the handle portion 16 of the fishing rod 14, the apertured ear 100 is disposed to lie flat against the exterior side of the end wall 32, and the threaded fastener 36 (previously removed from the reel 10) is extended through the apertured ear 100, thence through the wall 32 and threaded into the adjacent end of the member 26, whereby the battery housing 62 is attached to the reel 10 without any modification of the latter, and it will be noted that such mode of attachment of the battery housing 62 to the reel 10 establishes electrical continuity between the battery housing 62 and the frame 18 and thus also to the crank arms 44 and 46. It will be noted that the threaded fastener 36 directly engages both the frame member 26 and the apertured ear 100 and also it will be noted that the apertured ear 100 is in direct physical engagement with the end wall 32, whereby electrical continuity is assured.

An arcuate length of stiff insulated wire 110 is provided, which is folded upon itself as indicated at 112 (see FIGURE 4), such wire 110 extending as a terminal portion 114 for a short interval in a straight form from the bend or bight 112, and such extent 114 of the insulated wire 110 terminates in a tubular metallic socket 116 that is mechanically and electrically attached to the conductor 118 of the insulated wire 110. The end of the insulated electrical conductor 84 remote from the cap 74 terminates in a prong or pin 120 frictionally receivable within the tubular socket 116, it being understood that the prong or pin 120 is mechanically and electrically connected to the conductive portion of the insulative conductor 84. Thus, the conductive portion of the insulated conductor 84 can be selectively placed in electrical engagement with the conductor 118, and additionally, the insulated wires 84 and 110 can be entirely detached from each other mechanically when desired. In short, the socket 116 and the pin 120 constitute a mechanical and electrical detachable coupling of the insulated conductors 110 and 84.

Means is provided for mechanically mounting the insulated wire 110 upon the end wall 32 of the fishing reel 10 while maintaining the conductor 110 electrically insulated from the frame 18. Such means comprises an apertured tab or bracket 126 embracing the insulated wire 110 at the end of the latter remote from the socket 116, and the threaded fastener 38 (previously removed) being extended through the apertured tab 126 and thence through the end wall 32 and being threaded into the frame member 30. The tab or bracket 126 can be metallic if desired inasmuch as the same contacts only the insulation 128 of the insulated wire 110. The arcuate extent of the insulated wire 110 from the tab 126 to the bight portion 112 thereof is disposed about and in close proximity to the periphery of the end wall 32, and is preferably disposed so as to lie substantially in the same vertical plane as the axis of the battery housing 62. The battery housing 62 has soldered thereto a short flange or rib 130 that is radially extending toward the flange 34 of the gear housing and which is substantially in the same vertical plane as the axis of the battery housing 62. The flange or rib 130 is disposed approximately at the same position along the axial extent of the battery housing 62 as the apertured ear 100, and is disposed so as to extend between the arcuate extent of the insulated wire 110 and the terminal portion 112 (see FIGURE 4). Such relationship of the flange 130 to the insulated wire 110 serves to stabilize or fix the position of the arcuate wire 110 with respect to the end wall 32.

It will be noted that the flange 130 can be spaced from the bight portion 112 of the insulated wire 110 (see FIGURE 4), but it is evident that the flange 130 can be disposed relatively near to or further from such bight portion 112, the arrangement being such that a significant degree of adjustability is afforded between the positions of the apertured ear 100 and the mounting tab or bracket 126, such adjustability being desirable to accommodate the attachment 60 to fishing reels wherein the spacing between the threaded fasteners 36 and 38 may differ.

At a position along the arcuate extent of the insulated wire 110, preferably at a position intermediate such extent as shown, the insulated wire 110 is provided with a contactor 136. The electrical contactor 136 is preferably in the form of a short resilient metallic coil or spring 138 having a straight terminal end portion 140. The axis of the metallic coil spring 138 is preferably normal to the plane of the end wall 32, that is, normal to the plane of rotation of the crank arms 44 and 46, and has its inner end mechanically and electrically securely fastened to the conductor 118 of the insulated wire 110. The straight end portion 140 is of sufficient extent as to project into the travel path of the crank arms 44 and 46 during rotation of the latter, and the axial extent of the helical coil spring 138 is such that the latter terminates short of such travel path of the crank arms 44 and 46. It is to be expressly understood that the contactor 136 is electrically insulated from the frame 18 of the fishing reel 10.

From the foregoing, the structure of the attachment or signaling device 60 as well as the mode of its attachment to the fishing reel 10 will be fully understood. The operation of the attachment 60 in combination with the fishing reel 10 will now be described.

With the attachment 60 mounted on the reel 10 as previously described, the same can be rendered inoperative by the simple expedient of removing the plug 120 from the socket 116, care being taken to prevent the plug 120 from coming into contact with any other conductive materials. The combination is, of course, operative when the plug 120 is positioned in the socket 116. When the combination is placed in operative condition, the electric lamp 68 is energized intermittently during rotation of the reel 31 by reason of the fact that such rotation of the reel 31 is accompanied by rotation of the crank arms 44 and 46, and for the reason that such crank arms 44 and 46 are alternately in intermittent engagement with the contactor 136 during their rotation, such engagement of either of the crank arms 44 and 46 with the contactor 136 serving to complete an electric circuit between the conductor of the insulated conductor 84 and the battery housing 62. In other words, each of the crank arms 44 and 46 serves the function of the movable contact of a rotary electric switch.

Accordingly, a fisherman may leave his fishing rod 14 unattended at night taking care that neither of the crank arms 44 and 46 is in engagement with the contactor 136, and then if a fish takes the fishing line 150, the latter will by virtue of being unwound from the reel 31 cause the latter to rotate with consequent rotation of the crank arms 44 and 46 with consequent intermittent energization and flashing of the electric lamp 68. Not only does the fisherman receive a flashing visual indication that a fish is taking the line 150, but the frequency of the flashes serves as an indication as to the rate that the line 150 is being taken.

It is especially important to point out that the electrical contactor 136 constitutes an extremely minor impediment or resistance to the free rotation of the crank arms 44 and 46, this being deemed highly advantageous and important in that the operation of the combination insofar as the attachment 60 is concerned does not impose any significant amount of resistance to the free taking of the line 150 by a fish.

It is thought highly important that resistance to the taking of the line 150 by a fish be kept to an obsolute minimum. It is indeed such desire to minimize such resistance that precludes the use of the conventional clicking mechanism for this purpose because the operation of the clicking mechanism necessitates considerable tension on the line 150. Were such not the case, the audible sound produced by the clicking mechanism would serve to alert the fisherman that his unattended fishing apparatus needed immediate attention. The flashing light not only serves to signal the need for attention, but greatly facilitates the fisherman in locating his fishing apparatus in the dark.

As previously explained, the attachment 60 does not necessitate modification of extant fishing reels for the mounting thereof. It is also of substantial importance that when once attached, the attachment 60 can be removed and the fishing reel restored to exactly its original condition whenever desired. All working components of the combination are exposed to ready inspection, and it is never necessary to remove any portion of the fishing reel other than the threaded fasteners 36 and 38 in order to inspect, repair or replace any part of the signaling device 60.

Notwithstanding the fact that the entire attachment 60 is disposed externally of the fishing reel 10, the attachment is disposed in such a position as to minimize obstruction of manipulation of the crank arms 44 and 46 as well as to minimize any obstruction to visual inspection of the condition of the reel 31 and the line 150 wound thereon.

We claim:

1. A signaling accessory for use with a conventional fishing reel of the class having an electroconductive frame and an electroconductive reel crank arm in mechanical and electrical contact with the frame; said accessory comprising a signaling device including a battery and an electric lamp, each having first and second terminals with the first terminals thereof being in electrical contact, said device being provided with electrically conductive means in electrical engagement with the second terminal of the lamp and enabling the device to be mounted on and electrically connected to the reel frame, and an electric circuit means connected to the second battery terminal and including an electrically conductive contactor adapted to be positioned in the travel path of the crank arm so as to be intermittently brushed by the arm during rotation of the latter, whereby the accessory may be mounted on a conventional fishing reel and the lamp caused to be energized on each occurrence of the contactor being engaged by the crank arm.

2. The combination of claim 1, wherein said device includes an electrically conductive battery housing electrically connected to the second terminal of the lamp with the first terminal of the lamp being electrically connected to the first terminal of the battery at a position within the housing, said means for enabling the device to be mounted comprising an electrically conductive mounting bracket carried by and in electrical engagement with the housing, said bracket including an apertured ear whereby the bracket may be secured to and electrically connected to the reel frame by a threaded fastener, and wherein the electric circuit means comprises an electrically isolated conductor connecting the second terminal of the battery to the contactor, and means including electrical insulation for enabling the contactor to be mounted upon the reel frame.

3. The combination of claim 1, wherein the device includes an electrically conductive battery housing connected to the second terminal of the lamp with the first terminal of the lamp being electrically connected to the first terminal of the battery at a position within the housing, said means for enabling the device to be mounted comprises an electrically conductive ear electrically and mechanically connected to the housing, said ear being apertured whereby a threaded fastener may be applied to mechanically and electrically secure the ear to the reel frame, and wherein the housing is provided with an outwardly extending flange, said electric circuit means including an insulated electric conductor having a first end folded about the flange and a second end, said insulated conductor being arcuate whereby the same is adapted to conform generally to the configuration of the reel frame adjacent to the travel path of the crank arm, said contactor being connected to the insulated conductor intermediate said second end of the latter and the flange, and means electrically connecting the second terminal of the battery to the first end of the insulated conductor.

4. The combination of claim 3, wherein the housing includes a removal cover enabling replacement of the battery, and wherein said last means includes a flexible conductor provided with electric contactor means extending through the cover.

5. The combination of claim 4, including a pin and pin socket detachably connecting the first end of the insulated conductor to the flexible conductor.

6. In a fishing reel of the type including an electrically conductive frame and an electrically conductive reel crank arm having electrical conductivity with said frame; the combination therewith of electrically actuated signal means mounted on the frame, and means for supplying electrical energy to said signal means including an electric switch in electrical series with the crank arm, the frame, a source of electrical energy and the signal means, said switch being normally open and comprising an electric contactor carried by and electrically insulated from the frame, said contactor being disposed in the travel path of the crank arm whereby the contactor is electrically engaged and the switch thereby intermittently closed during each revolution of the crank arm.

7. The combination of claim 6, wherein the fishing reel includes a reel mounted in the frame for rotation about an axis, and gear means at one end of the reel interconnecting the reel and the crank arm whereby the crank arm is caused to rotate on rotation of the reel, a generally circular gear housing wall normal to the axis and coaxial with the reel and interposed between the gear means and the crank arm, said wall being carried by the frame, said signal means being disposed radially outward of the wall and being disposed substantially in the same plane as the gear means, whereby visual and physical obstruction of the crank arm and the reel is minimized, and electroconductive means mounting the signal means on the wall, said last means being in electrical series with and electrically connected to the frame.

8. The combination of claim 7, wherein the wall is detachably secured to the frame by a threaded fastener extending through the wall, said electroconductive means mounting the signal means on the wall including an apertured ear, and said fastener extending through the apertured ear to secure the wall to the frame and also to mount detachably the signal means on the wall.

9. The combination of claim 8, including an elongated and arcuate member having one end connected to the signal means and extending therefrom about the periphery of the wall to a second end circumferentially spaced from the fastener, the said second end of the member being provided with a mounting ear having an opening therethrough, and a threaded fastener extending through the opening and the wall and detachably securing the arcuate member to the frame, said electric contactor being carried by the arcuate member, with the extent of the latter intermediate the signal means and the contactor being electrically conductive, and means for preventing electrical engagement of the electriaclly conductive extent of the arcuate member with the frame.

10. The combination of claim 9, wherein the contactor is resilient for flexing upon engagement by the crank arm, and wherein the signal means comprises a lamp in electrical series with a battery.

References Cited
UNITED STATES PATENTS

| | | | |
|---|---|---|---|
| 2,599,099 | 6/1952 | Folker | 43—17 X |
| 2,645,050 | 7/1953 | Golias | 43—17 |
| 2,755,590 | 7/1956 | Collins | 43—17 |
| 2,771,703 | 11/1956 | Jones | 43—17 |
| 2,785,491 | 3/1957 | Gibson | 43—17 |
| 2,798,126 | 7/1957 | Burge | 43—17 X |
| 2,929,167 | 3/1960 | Jones | 43—17 |
| 3,275,260 | 9/1966 | Woollen | 43—17 X |

SAMUEL KOREN, *Primary Examiner.*

DANIEL J. LEACH, *Assistant Examiner.*